US010789781B2

(12) United States Patent
Schulze et al.

(10) Patent No.: US 10,789,781 B2
(45) Date of Patent: Sep. 29, 2020

(54) INTERACTIVE FRAME-SYNCHRONIZED AUGMENTED VIDEO

(71) Applicants: Jack Schulze, London (GB); Timo Arnall, London (GB); Nicholas Ludlam, London (GB)

(72) Inventors: Jack Schulze, London (GB); Timo Arnall, London (GB); Nicholas Ludlam, London (GB)

(73) Assignee: Playdeo Limited, London (GB)

( * ) Notice: Subject to any disclaimer, the term of this patent is extended or adjusted under 35 U.S.C. 154(b) by 0 days.

(21) Appl. No.: 16/557,323

(22) Filed: Aug. 30, 2019

(65) Prior Publication Data

US 2020/0074741 A1    Mar. 5, 2020

Related U.S. Application Data

(60) Provisional application No. 62/726,399, filed on Sep. 3, 2018.

(51) Int. Cl.
*G06T 19/00* (2011.01)
*A63F 13/5258* (2014.01)
*G11B 27/036* (2006.01)

(52) U.S. Cl.
CPC ........ *G06T 19/006* (2013.01); *A63F 13/5258* (2014.09); *G11B 27/036* (2013.01); *A63F 2300/63* (2013.01)

(58) Field of Classification Search
None
See application file for complete search history.

(56) References Cited

U.S. PATENT DOCUMENTS

| 2011/0242134 | A1* | 10/2011 | Miller | G06T 19/006 |
| | | | | 345/633 |
| 2013/0307875 | A1* | 11/2013 | Anderson | G06T 19/006 |
| | | | | 345/633 |
| 2019/0371030 | A1* | 12/2019 | Roesler | G06T 15/06 |

\* cited by examiner

*Primary Examiner* — Vu Nguyen
(74) *Attorney, Agent, or Firm* — Aurora Consulting LLC; Ashley Sloat

(57) ABSTRACT

Systems and methods for providing an interactive augmented experience using prerecorded video include: creating a scene model based on an image of a physical environment; generating a fantasy object; integrating a position of the fantasy object onto the scene model; determining a state of the fantasy object; selecting, using a type of meta data, one or more frames of a pre-recorded video of the physical environment associated with a desired physical camera, such that each of the frames is associated with a frame number and acquired with a physical camera; synchronizing a virtual camera with the desired physical camera; and projecting, using a first video player or a second video player, the one or more frames onto the scene model to position the scene model relative to the fantasy object, such that the projecting alternates between the first video player and the second video player.

20 Claims, 6 Drawing Sheets

INTERACTIVE FRAME-SYNCHRONIZED AUGMENTED VIDEO

CROSS-REFERENCE TO RELATED APPLICATIONS

This application claims the priority benefit of U.S. Provisional Patent Application Ser. No. 62/726,399, filed on Sep. 3, 2018, the contents of which are herein incorporated by reference in their entirety.

TECHNICAL FIELD

This disclosure relates generally to the field of interactive augmented video. Described herein are systems and methods for interactive frame-synchronized augmented video.

BACKGROUND

Many electronic devices include display subsystems that use image-rendering techniques to present visual information to users. For example, many display subsystems present visual information using one or more two-dimensional (2D) images (such as a 2D view of an image in a plane) that are displayed on a display.

Recently, electronic devices have combined images of real-world (which is sometimes referred to as 'physical') objects with computer-generated objects and perceptual information, which is sometimes referred to as 'augmented reality' or 'mixed reality.' Mixed reality can be used to provide an interactive experience that adapts to user actions and inputs, and that provides supplemental information in context to a user.

However, while systems currently exist to integrate fantasy objects with real world or physical objects in live camera feeds, for example on electronic devices, few systems exist to allow integration of fantasy objects with physical objects in pre-recorded video, herein referred to as interactive augmented video. Interacting fantasy objects with physical objects in pre-recorded video on electronic devices presents a different set of technical challenges that are not encountered in augmented reality or mixed-reality. It can be difficult to seamlessly integrate computer-generated objects with pre-recorded video (such as those acquired using an image sensor or off-line recorded video accessed in memory) to generate interactive augmented video.

This difficulty, in part, stems from the fact that video isn't interactive—it's predetermined and linear. Because of modern video compression (which is structured around the expectation that video will be played in one direction and with frames in sequence) it is slow and difficult to access frames of video out of sequence. Typical interactive video games, that do not use prerecorded video, allow players a high degree of control over how their actions advance the experience. For example, interactive video experiences require audience decisions which determine which frames of video are accessed. This presents a problem in the speed with which various frames can be decoded to produce a seamless experience. This is not true when a video file is used or in a prerecorded television show. The problem is compounded by the fact that most video files and video players don't include spatial information about camera locations during recording. The problem that this technology sought to solve was how to give players spatial and temporal control over prerecorded video in an interactive gaming experience.

The systems and methods described herein describe various technological advances and solutions that allow spatial and temporal control of prerecorded video to seamlessly provide an interactive, engaging, realistic, and tangible experience to players. For example, the systems and methods described herein allow the processing subsystem to receive unusual information from the video player which is video frame numbers. The processing subsystem uses the image frame numbers to move the virtual cameras to a virtual location that mirrors a physical location of a physical camera used to capture the pre-recorded video so as to synchronize the fantasy objects with the physical objects in the pre-recorded video.

BRIEF DESCRIPTION OF THE DRAWINGS

The foregoing is a summary, and thus, necessarily limited in detail. The above-mentioned aspects, as well as other aspects, features, and advantages of the present technology are described below in connection with various embodiments, with reference made to the accompanying drawings.

Figure 1:
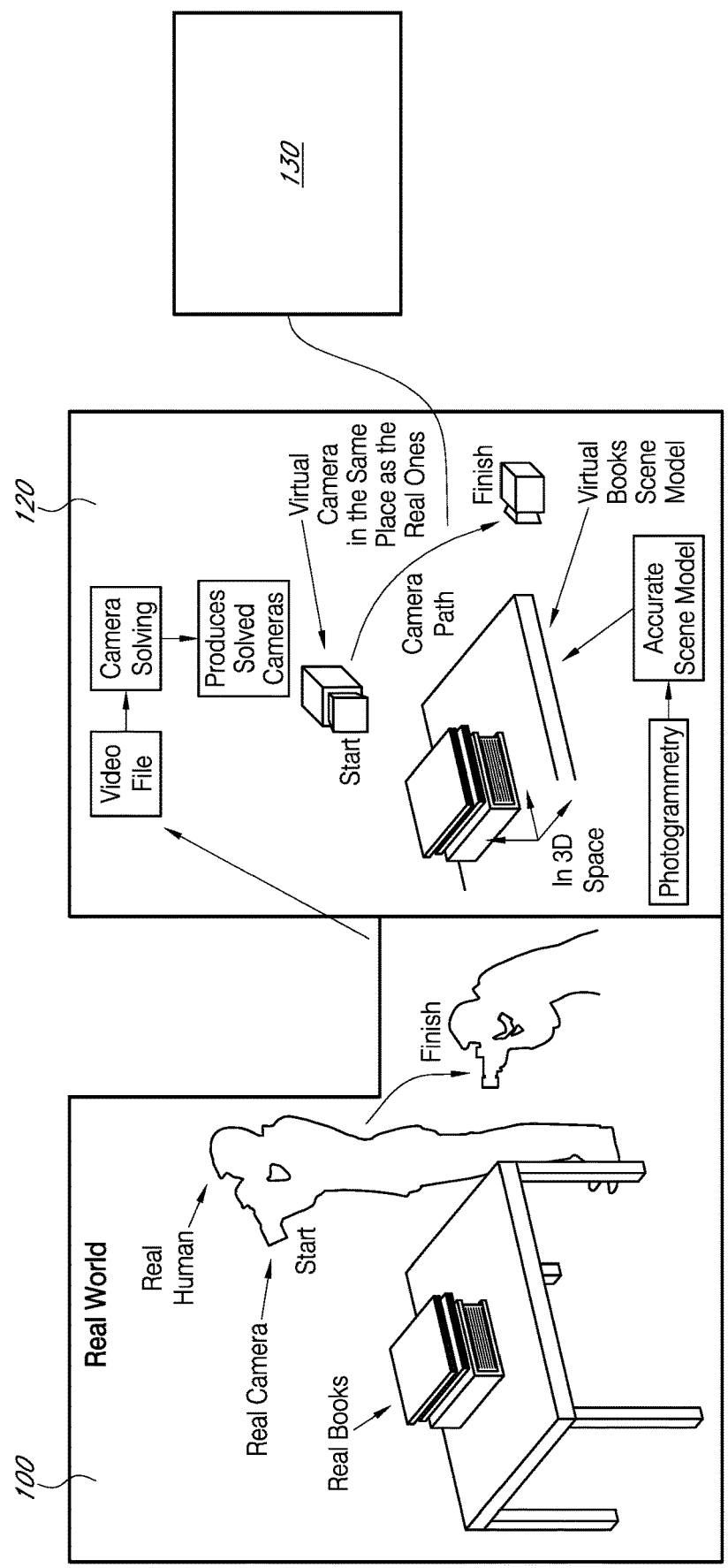
FIG. 1 illustrates a schematic of one embodiment of a frame-based interactive augmented video system.

The illustrated embodiments are merely examples and are not intended to limit the disclosure. The schematics are drawn to illustrate features and concepts and are not necessarily drawn to scale.

DETAILED DESCRIPTION

The foregoing is a summary, and thus, necessarily limited in detail. The above mentioned aspects, as well as other aspects, features, and advantages of the present technology will now be described in connection with various embodiments. The inclusion of the following embodiments is not intended to limit the disclosure to these embodiments, but rather to enable any person skilled in the art to make and use the contemplated invention(s). Other embodiments may be utilized and modifications may be made without departing from the spirit or scope of the subject matter presented herein. Aspects of the disclosure, as described and illustrated herein, can be arranged, combined, modified, and designed in a variety of different formulations, all of which are explicitly contemplated and form part of this disclosure.

The systems and methods described herein are configured to render fantasy objects relative to a pre-recorded video, such that a virtual camera position in the resulting interactive augmented video is synchronized with a camera position in the pre-recorded video. The camera clip or one or more frames in the interactive augmented video dynamically updates based on user input (e.g., to move or change a position or location of a fantasy object), game state, a rules engine, preconfigured settings, etc. The clip or one or more frames in the interactive augmented video updates to reflect an appropriate camera angle, view, and/or position for a current position (e.g., behind a book, on a left side of a table, etc.) and/or activity (e.g., talking to a character, moving across a surface, etc.) of the fantasy object. In some embodiments, the systems and methods described herein are configured to use one or more images (e.g., still images, frames form a video, etc.), the pre-recorded video, or a plurality of pre-recorded images, clips, or frames to create a scene model or mesh of a physical environment. One or more pre-recorded frames or clips are projected dynamically (based on clip or frame selection) onto the scene model or mesh, for example, during runtime. In some embodiments, the scene model or mesh of a physical environment is, in part, created by using laser mapping, LIDAR (i.e., laser detection and ranging), or similar technology. The scene model or mesh includes one or more physical objects that, in some embodiments, may be used to occlude a fantasy object or provide a point of interaction with the fantasy object (e.g., collision point).

As used herein, a "user" refers to a player of the game or interactive video described herein. "User" and "player" may be used interchangeably.

As used herein, a "physical object" refers to an object in a pre-recorded video.

As used herein, a "fantasy object" refers to imagery (e.g., game objects, user interfaces, people, animals, food, players, etc.) generated by the modelling subsystem (i.e., game engine) at runtime (in the electronic device while the user is using it). "Fantasy object" and "computer-generated object" may be used interchangeably herein.

As used herein, a "scene model or mesh" refers to a model of a scene and physical objects contained in the video (but is usually invisible to the player). The scene model or mesh is used to create realistic physical interactions in the game between the fantasy object and the environment (e.g., occlude fantasy objects, provide basis for collision geometry, etc.) and realistic visual effects (e.g., shadows and light effects relevant to a time of day, location, etc.). Such physical interactions and/or visual effects may change or be limited or not be present based on user input or interaction with the system. Further, the contours of the mesh, as defined by the methods described elsewhere herein, determine how a video frame falls or lies, or in other words, is projected, (such as a table cloth draped over the mesh) onto the mesh.

As used herein, "acquisition time" is used to refer to video production, video post-production and processing, and game development.

As used herein, "run time" or "game time" is used to refer to the time or interaction of the player or user with the game or interactive video.

As used herein, a "decoder," "video decoder," and "video player" are used interchangeably. A video decoder is an electronic circuit that converts compressed video data to digital pixel values which are passed into a digital pixel buffer, which the games engine is then painting to the display.

As used herein, "location" and "position" are used interchangeably to refer to an x, y, and/or z coordinate of an object.

In some embodiments, the systems and methods described herein are performed on one or more electronic devices, for example a mobile computing device. A computation device (such as one or more processors and/or one or more graphics processing units or GPUs) in an electronic device creates an accurate scene model or mesh of a physical environment (which may or may not include the electronic device). For example, as shown in FIG. 1, the model may be based at least in part on a set of images of a physical environment that were acquired locally or remotely (e.g., via one or more video cameras for video and/or one or more cameras for still images), as shown at Block 100, and that were received by the electronic device (such as via a wired or a wireless network). Alternatively, the electronic device may capture multiple real-world images of a physical environment using one or more imaging sensors (such as a CMOS or a CCD imaging sensor).

As shown in Block 120, the video may be interpreted offline and information about camera position(s) or how the camera moved (e.g., x, y, and/or z movement), which may represent perspectives or various views, relative to each frame of video may be generated. Moreover, a scene mesh with information about a scene (such as a pile of books on a table) may be generated using the pre-recorded video and additional images of the physical environment. Items in the scene mesh that are wrong may be tuned to ensure pixel perfect location, for example for pixel perfect occlusion of a fantasy object. Correcting items in the scene mesh may be a manual process or, in some embodiments, a machine may be trained to recognize common errors in scene mesh generation processes. The pre-recorded video may be recorded and encoded as a video file, e.g., an MP4 file. This file may be decoded on an electronic device. A first or second video decoder or video player may provide or send up a frame of video. Then, the video decoder may indicate what frame it is at (uncoupled or unrelated to the audio stream). Using information that specifies a camera position, as shown in Block 130, relative to this frame (e.g., sometimes referred to as 'solving the camera'), the electronic device may synchronize the virtual camera (e.g., that defines a virtual environment relative to the fantasy object) with a physical camera for a particular clip or frame of video that displays the appropriate perspective or view. For example, solving the camera may include determining a position of the camera or whether the camera panned or zoomed and, more generally, how the camera moved relative to a particular frame of the video. The use of an external camera may allow for pre-structured material or content to be curated. For example, scenes may be constructed to accommodate a desired game or experience for presentation.

Moreover, a variety of techniques may be used to determine where the camera is relative to a frame to ensure synchronization. In camera solving, a plurality of pixels of the environment may be captured while the camera is capturing video, and in some instances, moving (e.g., to provide a consistent environment). Next, a pixel in the world is selected as the origin and every subsequent pixel is defined/located relative to the origin pixel. This pixel movement information is used to define how the real camera moved in a physical environment, for example whether it panned or zoomed or its location relative to a pixel and ultimately a frame of video. For example, a path to a next coordinate of the camera is projected on a pixel basis, not based on environment information. Note that information on a frame-by-frame basis that specifies how the camera moved in the physical environment is available, because of the time evolution of the pixels in the physical environment. Alternatively or additionally, any other software may be configured and/or used to solve the camera (i.e., determine a physical camera location for each frame).

In addition to determining where the camera is relative to a frame of video, the systems and methods described herein require an accurate scene model or mesh corresponding to the scenes in the pre-recorded video. One example of a method for creating such a scene model or mesh includes: acquiring a number of still images or video frames; determining an average survey of an object (scene view or model) using these images; determining a relationship between the images; and creating a point cloud or mesh to create a model of the physical environment. The scaled model of the physical environment and the pre-recorded video are combined to create an interactive augmented video in which actual objects in the physical environment are displayed in the virtual world in their appropriate locations based on camera position and/or movement and based on a location of one or more fantasy objects.

The electronic device (e.g., a cellular telephone) may use the pre-recorded video and, in particular, where the camera was at a particular frame (such as that the camera was at x, y, z in relation to the frame) or other meta data, as described elsewhere herein, to place the scene model in the correct location relative to a fantasy object.

Thus, in some embodiments, the presentation technique may be performed by one or more computers or electronic devices, such as a computer that performs the offline processing and a cellular telephone that decodes the pre-recorded video and displays it relative to a computer-generated object or fantasy object.

Thus, the camera feed or video used in the presentation technique may not be locked to a representation of the real world around the electronic device. In some embodiments, the camera feed or video is a pre-recorded video comprising a plurality of clips; each of the clips comprising a plurality of frames. The real-world images or video file (or a set of clips or a set of frames) may be stored in memory and provided or input into a modelling subsystem (or module) in the electronic device (or that executes in an operating environment of the electronic device). Thus, the modelling subsystem, as well as other subsystems (or modules) used in the presentation technique, may be implemented using hardware and/or software. As described further below, the modelling subsystem, as well as other subsystems (or modules) used in the presentation technique, may generate computer-generated information and may combine the computer-generated information with the images on a frame or clip basis, for example combined with one or more clips or frames from a pre-recorded video. Such pre-recorded video may be decoded and played using a first video player and a second video player.

The problem with using a single video player is that video plays forward and ends. If a user doesn't act to advance a gaming experience before the clip ends, the user is forced into a new clip or worse, the clip just stops. Further, for example, if there is a fantasy object on a table, the table may be divided into two zones (such as left and right). If the player moves the fantasy object to a right-hand side of the table, the left-hand side cannot be seen (unless there were more than two camera zones). In this example, two camera angles are used (e.g., a $1^{st}$ second of the clip on loop while on the left-hand side of the table, and a $2^{nd}$ second of the clip on loop when on the right-hand side of the table). To arrive at the correct frame (e.g., for the left or right side of the table) in the clip at the appropriate second, a single video player will seek forward or backward. However, this may take an unpredictable amount of time, for example based on where the nearest required frame (iframe or keyframe) is, and how many additional frames need to be decoded before the requested frame can be fully decoded itself. This is more than the gap between any two adjacent frames (i.e., ¹/₂₅th of a second), so the user perceives an unwanted pause in the flow of video frames. Thus, using a single decoder can create visual discontinuity in the video and limit the quality of a user's experience.

Figure 4:
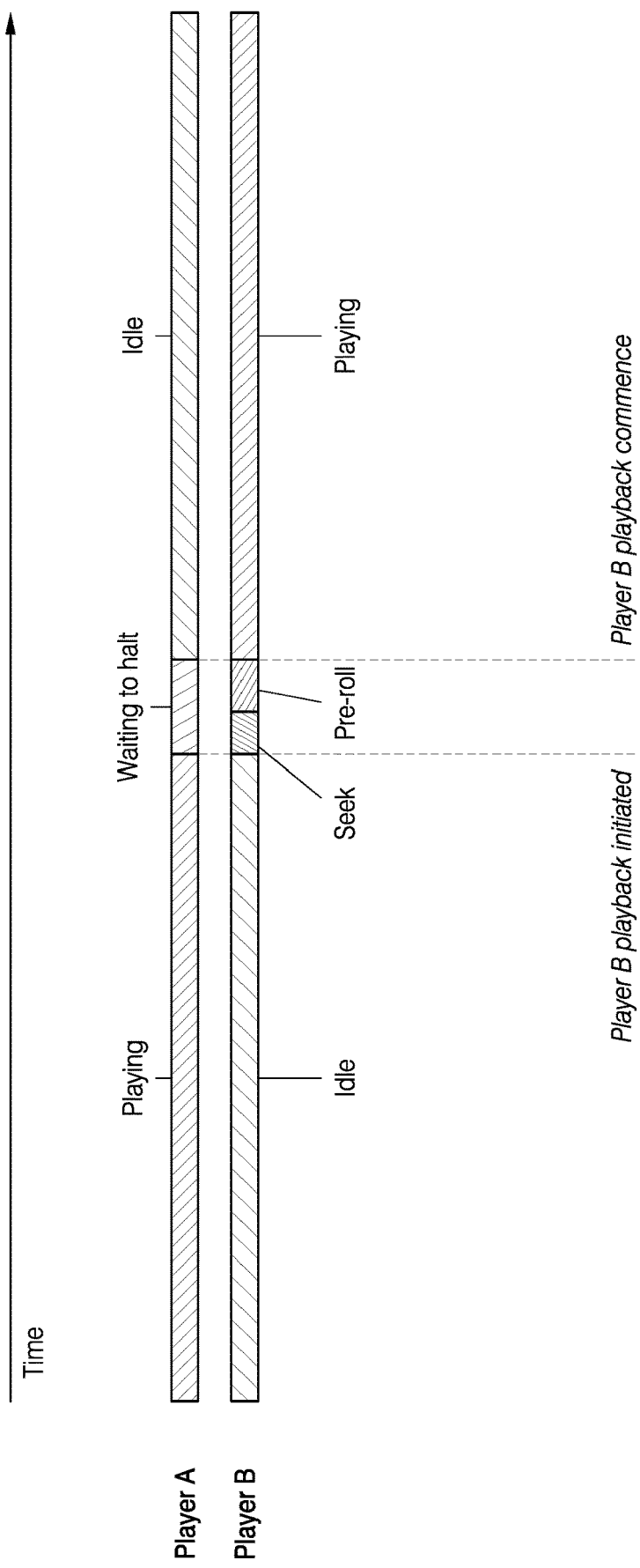
FIG. 4 illustrates a schematic of a timing sequence between a first video player (A) and a second video player (B) in an interactive augmented video system, according to an embodiment.

In order to reduce this delay or, at minimum, have a predictable delay that the system can account for, the systems and methods described herein use two video players (i.e., decoders) in parallel, running the same video, as shown in FIG. 4. In the example where the game experience is waiting for player input to advance the experience, using two video players enables looping for any given clip or one or more frames in a realistic way until the user acts to advance the gaming experience. In this scenario, the looping can proceed for an undefined, undetermined period of time until the user acts to advance the game. When the system receives a user input that indicates that the user wants to advance the game, the system cuts to a new clip or frame using a second video player or releases the current clip from its loop and allows the clip to play forward, using the first video player. In other words, switching to the second video player allows the system to leave the loop. By selectively playing clips or looping a clip using a first video player or a second video player, the game experience behaves seamlessly and doesn't force the user forward in the experience. This switching between a first video player and a second video player takes a pre-determined amount of time based, at least in part, on an audio delay between the system and a wired or wireless headset worn by the user, a time it takes either video player to find and play the appropriate clip or frame, or any other parameter. In some embodiments, the pre-determine delay is 0.0001 to 0.01 second, 0.01 to 0.1 second, 0.1 to 0.2 seconds, 0.2 to 0.4 seconds, or 0.4 to 0.8 seconds, etc.

As described herein, all clips are encoded in a single video file, which is subsequently decoded by both decoders in parallel. Alternatively, in some embodiments, all clips are encoded in a plurality of video files, which are subsequently decoded by both decoders in parallel. Therefore, instead of seeking forward or backward in the video to arrive at an appropriate clip or frame, the system switches between the two decoders to play the appropriate clip or frame at the appropriate time. In other words, a first decoder is playing a first clip and, when a new clip is needed, for example based on user input or movement in the interactive augmented video, the system then switches to a second decoder to play the new clip that is needed. The time it takes to switch between the two decoders is predictable, for example 0.2 seconds (or 0.0001 to 0.01 seconds or 0.01 to 0.1 seconds or 0.1 to 0.2 seconds or 0.2 to 0.4 seconds or 0.4 to 0.8 seconds), which can be compensated for by forward-predicting into the future by any desired number of seconds, according to the current video player input. Such forward-predicting is further illustrated in FIG. 6. In some embodiments, the system is configured to delay in playing the second video (i.e., may continue playing or looping the first video) after the user has requested a change to account or compensate for a delay in swapping between a first video player and a second video player.

For example, as shown in FIG. 4, a clip includes a plurality of frames per second (e.g., 25 frames per second). Based on a camera position at a moment in time, a first video player, shown as Player A, may locate and play a particular frame of the video with a particular camera position (e.g., the frame or clip is selected based on meta data as described elsewhere herein), so that a virtual camera associated with a scene model of a physical environment and the video are synchronized, stay locked together, and the interactive reality appears continuous and uninterrupted to the user. The system then switches to the second video player, shown in FIG. 4 as Player B, which is ready with a new frame of video, when a new camera location or position is requested based, at least in part on, user input, and in some embodiments, additional meta data. The first or inactive video player (Player A when Player B is playing or Player B when Player A is playing) remains idle while the second or active video player plays, and vice versa. As shown in FIG. 4, while a first video player (i.e., Player A) is waiting for the second video player (i.e., Player B), the first video player loops the clip for a predetermined length of time (e.g., 0.2 to 0.7 seconds). During this predetermined time frame, the second video player initiates a playback sequence in which it seeks to an appropriate clip or frame based on user input or game state. The second video player then starts to play the clip or series of frames in a clip, at which point, the first video player becomes inactive and the second video player becomes the active video player to allow the game experience to advance. The system thus switches back and forth between receiving one or more clips or one or more frames from the first video player and the second video player to create a seamless user experience. Thus, there may not be any temporal slippage between the virtual camera and the video.

Using two decoders gives the user the impression that there is one video running, while in fact there are two video players running synergistically to provide a seamless interactive augmented video experience. For example, in some embodiments two decoders in the electronic device may decode two video files concurrently. Returning to our example of a computer generated object on a table, the table may be divided into two zones (such as left and right). The two video players may decode the same video file but decode it twice. A first video player may decode for the left-hand side of the table, and a second video player may begin playing from the moment it is needed (such as after the computer generated object crosses a threshold to the right-hand side of the table), e.g., after a query is sent to the second video player for a particular frame. Because the two video players have the same video file, during the presentation technique they can be switched back and forth as a function of different positions or different parts of the story. This may allow quick and predictable movement between clips or frames (such as a predictable 0.2 second delay between switching, which may allow the cutting process to offset the 0.2 second delay). Thus, using two video players remedies many of the shortcomings of using just one decoder.

As noted previously, performing the operations in the presentation technique on a frame basis is needed in order to temporally synchronize the pre-recorded video with a virtual camera to create the fantasy 3D experience. Note that using frames may allow the presentation technique to be performed faster without perceptible delays and more accurately using the processing power or capabilities that are available on a portable electronic device. In general, the frame number is much slower moving than the time or timestamp that can be obtained from a video. For example, in general there may be some 2000 audio samples per second, but only 25-30 frames per second. Because audio is much more-fine grained, timing information for video playback is usually driven by the audio decoder, and videos are often synchronized with the audio track. Consequently, in many applications the audio is the primary timing source.

However, given that audio is the primary timing source, when trying to obtain the playback time of a video, it may not be quantized to the video frames. Instead, the resulting playback time may be more continuous, and therefore less useful in determining when a new video or image frame has arrived.

In a simplified example, suppose there are 30 frames of video per second but an audio rate of 48 kHz. In this example, the data may be interleaved as follows: A, A, A, V, A, A, A, V, A, A, A, V, where 'A' is an audio frame and 'V' is a video frame or image. Both of the audio and video frames may cause the internal clock of a video player to count upwards. However, only a quarter of the time would this result in a new video frame. The remainder of the time would be responsible for audio playback. The persistence of vision and other human visual processing is often exploited to allow lower frame rates to be used. Human hearing is not as complicated of a signal processing system. Consequently, the audio sources have much finer temporal granularity and continuity.

For example, when the playback time is queried every $\frac{1}{60}^{th}$ of a second (note that the generating subsystem may run at 60 frames per second, while the real-world video may run at 25 frames per second), the result may be: FR playback time=121.3003, NF playback time=121.3166, FR playback time=121.334, NF playback time=121.3495, NF playback time=121.3659, and FR playback time=121.3835. Note that 'FR' indicates that there is a new video frame available and 'NF' indicates that there is no new frame. Consequently, if the timestamp is used, a steadily increasing clock is obtained, but not necessarily a new available video frame.

In summary, the internal clock of a video player or video subsystem does not signify when video frames are decoded. Therefore, in the presentation technique, a frame-number time source is created, because the presentation technique may use synchronizing of the visuals, such as synchronizing a virtual camera with a physical camera used to create a pre-recorded video, as opposed to synchronizing audio. This capability is not typically available in existing software video players.

Figure 5:
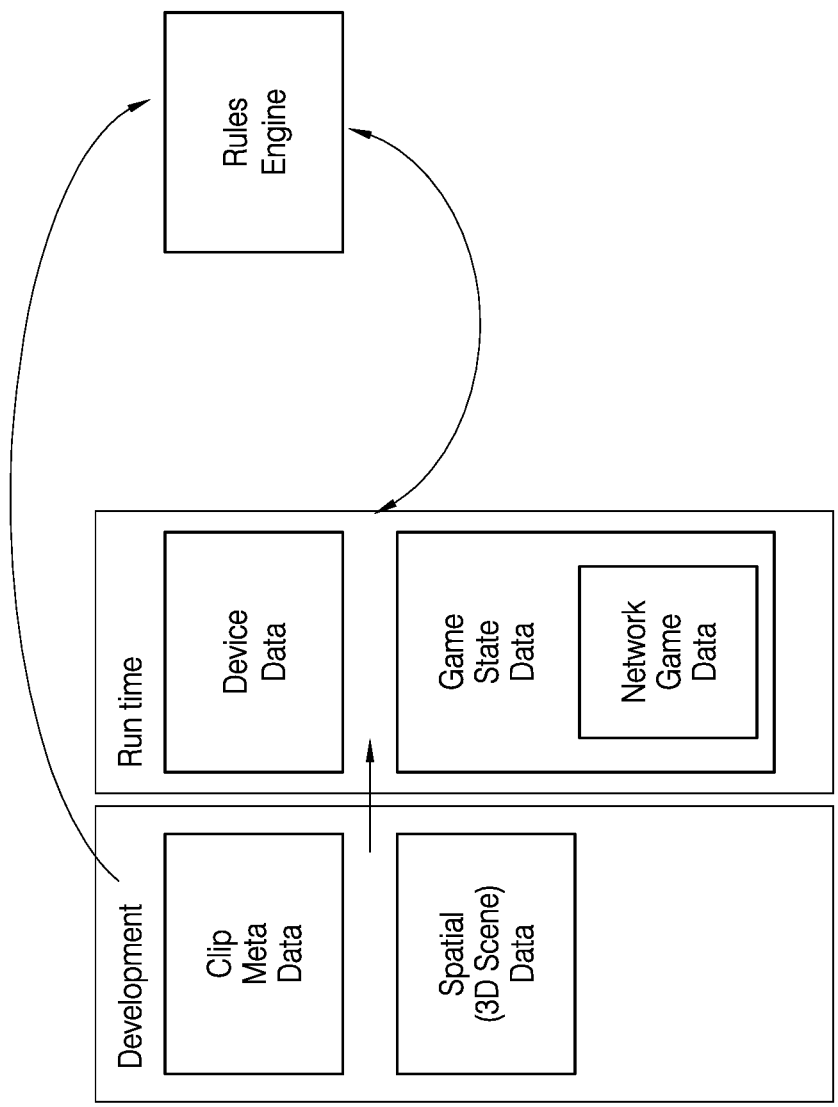
FIG. 5 illustrates, a schematic of various data sources and types of data used for the dynamic editing, according various embodiments.
Figure 6:
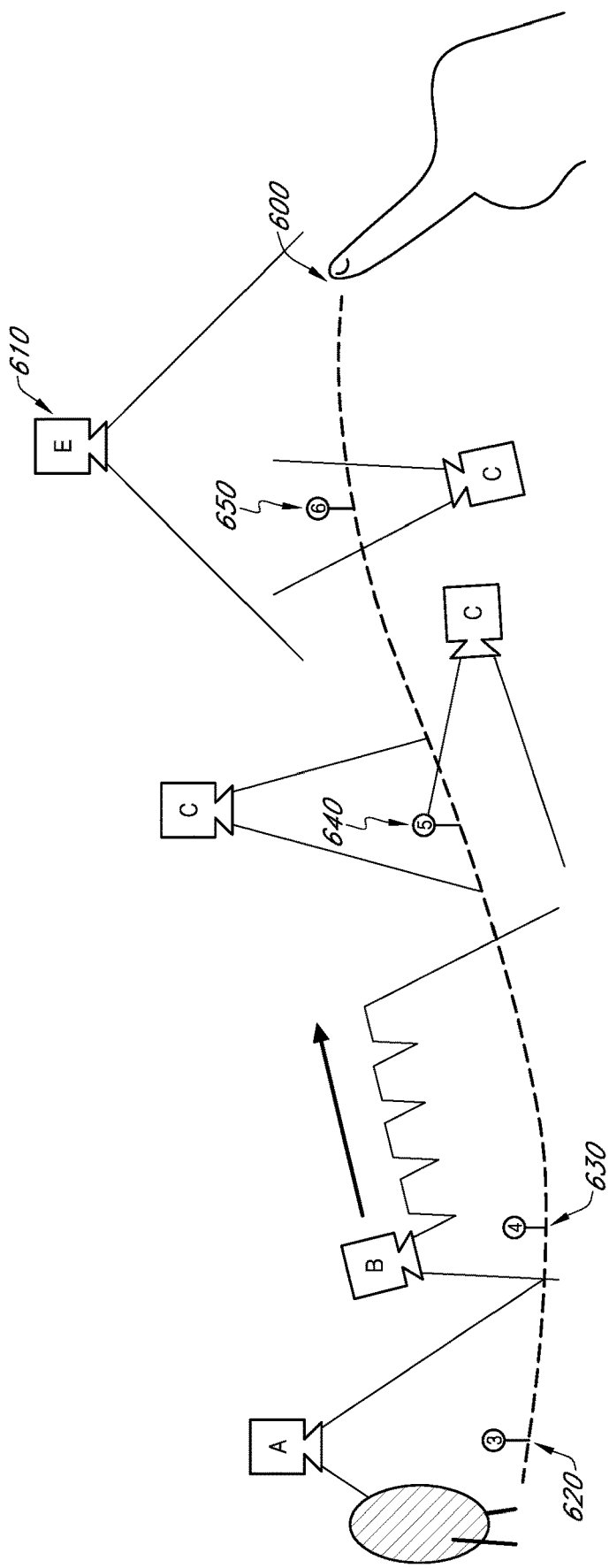
FIG. 6 illustrates a schematic of a method for dynamically editing prerecorded video.

Turning now to FIGS. 5-6. In some embodiments, the systems and methods described herein are used to generate and present a model of a scene and objects within it during runtime. The model of the scene and objects within it are correlated to a pre-recorded video that includes a database of camera coordinates for each video frame as well as additional metadata (e.g., camera, environment, game state, device data, network state or data, spatial or scene mesh data, etc.). The model of the scene and pre-recorded video are coordinated in space and aligned to work with each other using the frame numbers and the corresponding camera coordinates for each video frame and/or other available meta data. Stated differently, the electronic device may use a video frame number as a means of synchronizing the physical objects with the fantasy objects using the database of camera positions per frame and/or other available meta data. Any objects, animations, or user interface in the interactive augmented video is generated within a 3D coordinate system that correlates accurately to the physical objects and camera positions in the pre-recorded video.

In some embodiments, the system includes a database of metadata, as shown in FIG. 6, for a plurality of clips or frames comprising a pre-recorded video. In some embodiments, the database of metadata is generated previously (e.g., during development, post-processing, etc.) or during run time and is used to correlate, in one example, the positions of virtual cameras in the scene model with the positions of physical cameras used to originally record physical objects in the pre-recorded video. Because the system is configured to correlate a position of a virtual camera with a position of a physical camera in the pre-recorded video, there exists a need to dynamically move between clips or frames (e.g., a continuous shot that is from a different angle than other clips, a similar shot at a different time, etc. . . . ) to account for user actions and inputs, without significant delay. A video clip or frame may be selected not only based on a physical camera position but also other metadata associated with the camera, game state, user input, edit rules, etc.

Previously, a clip or frame was selected based on various floor switches built into a games engine. For example, when a fantasy object is walking around on a surface, it will trigger one or more switches on the surface. Upon triggering the switch, the games engine switches to a camera or clip or frame that can see the fantasy object, irrespective of the quality of the clip. In some instances, two cameras are pointing at same position. In such a scenario, a camera is selected based on which trigger was triggered first. There are at least a few problems with this method (1) the games engine wouldn't always select a good or best camera; (2) the rules were hard to implement because switches are crude and a very coarse filter; and (3) by the time a switch was triggered, the fantasy object already left that scene. For example, there is a lag (e.g., 200 millisec) between a switch being triggered and queuing the clip or frame to play. Thus, if a fantasy object is moving at a faster speed and triggering multiple switches in rapid succession, the system cannot discern which clip or frame is appropriate to play based on a fantasy object position and rather just plays all the triggered clips or frames in sequence at a faster rate resulting in the user only seeing the last few frames or last frame of every clip.

The solution to the problems described above is to create a system that allows dynamic editing based on user input, game state, etc. In dynamic editing, the system forecasts or forward predicts where a fantasy object will be at a future time and cues up the appropriate or best video clip or one or more frames in advance, based on the meta data described elsewhere herein.

FIG. 5 shows various types of meta data. In some embodiments, meta data include a tag, a binary or Boolean value (e.g., day or night in frame, presence of actor in frame, etc.), a numeric value (e.g., focal length of lens for the physical camera in the frame), or a text label (e.g., quality of frame, features of the frame, drama associated with the frame, various effects associated with a frame, etc.) associated with one, one or more, or a plurality of clips, frames, and/or cameras. For example, FIG. 5 shows that during development, clip meta data and scene or spatial meta data are created. Clip meta data may refer to, but not be limited to, a field of view (e.g., may be dependent on lens used to shoot video) of the video clip, an angle (e.g., close-up, wide, etc.) of the video clip, a depth of field of the video clip, a movement (e.g., static, panning, zooming, etc.) of the camera in the video clip, a camera movement direction in the video clip, features (e.g., includes actor, doesn't include actor, scene is on a bus, scene is in a lab, etc.) of the video clip, frame level meta data (e.g., actor is blinking), animation timing of a fantasy object's reaction to a pre-recorded video even (e.g., character is surprised by an actor popping out from behind a wall), a camera position for the video clip, etc. Spatial or scene mesh meta data may refer to, but not be limited to, an environment represented by the scene mesh, tracked objects (i.e., items in the scene which move independently from the scene mesh) in the scene mesh, actor faces as meshes, gaze direction, etc.

During runtime, as shown in FIG. 5, various types of device meta data are created or sensed. Non-limiting examples of runtime meta data include touch screen input (e.g., long press, dragging a digit in a predetermine path on the screen, etc.), device volume, time of day, location, acceleration (e.g., measured by a device internal accelerometer), etc. For example, if the user is playing the game during the night, clips or frames may be selected or the game state may be altered such that the fantasy object is represented in a nighttime environment. Non-limiting examples of game state meta data include: fantast object position with respect to the scene mesh, fantasy object speed, a user score, a time remaining in a game or level, a current game goal, etc. Within game state data, network game meta data includes, but is not limited to, positions of other users (e.g., in a multi-player user experience), synchronization of events (e.g., so that a subset or a plurality of users experience the same event), etc. The system filters and selects a single clip or one or more frames from all those available in the scene based on a rules engine. The rules engine may select a clip or one or more frames from all those available in a scene based on a set of rules, for example, but not limited to, no quick cuts (e.g., can't switch to a second clip within a predetermined time of having started playing a first clip, e.g., 0.25 to 0.5 second, 0.25 to 0.75 seconds, 0.5 to 0.7 seconds, 0.6 to 0.7 seconds, 1 to 2 seconds, etc.), give priority to clips or one or more frames that include close-ups of the actor or would provide a close-up of a fantasy object, give priority to clips or one or more frames that frame an actor or a fantasy object, etc. As such, meta data during development informs the rules engine, and there is bidirectional communication between game engine during run time and the rules engine so that a particular clip or one or more frames is selected to advance the user or fantasy object story in a realistic, tangible, cinematic, and engaging way.

Turning now to FIG. 6. FIG. 6 shows on exemplary, non-limiting embodiment of a method of dynamic editing. The method includes, at block 600, receiving a user input, for example a path or line drawn by a user on a display of an electronic device that indicates a movement path for a fantasy object. At block 610, the method includes identifying one or more increments or positions along the path at regular intervals, for example every 0.1 to 1 cm, 0.5 to 1 cm, 1 to 2 cm, 0.5 to 5 cm, substantially every 1 cm, substantially every 2 cm, etc. Alternatively, the intervals may be irregular, for example depending on whether the received user input indicates a pause in the drawn path or an interaction with one or more objects or other fantasy objects along the drawn bath.

Further, the method includes at each identified position or increment along the path, selecting, using meta data, one or more frames associated with a desired or best or appropriate camera. For example, selecting may include one or more of: selecting for those cameras or frames or clips that can see the fantasy object; selecting for those cameras or clips or frames that are moving in the same direction as the fantasy object; selecting for those cameras or clips or frames that frame the fantasy object, selecting for those cameras or clips or frames the match a time of day or a location of a user, selecting for those cameras or clips or frames that match or coincide with a desired effect of the scene (e.g., drama, sad, excitement, etc.), selecting for those cameras or clips or frames that provide for a particular field of view of the fantasy object (e.g., close-up, wide angle, etc.), selecting for those cameras or clips or frames that show a game goal, selecting for those cameras or clips or frames that show interaction between two or more users of the system, etc. Such selecting being dictated by the meta data associated with each clip, each frame, the scene mesh, the device data, the game state, the network state, the rules engine, etc. as shown in FIG. 5.

Exemplary, non-limiting embodiments of selecting are shown at blocks 620-650. At block 620, only one camera, Camera A, can see the fantasy object and the clip or one or more frames associated with Camera A is selected. Spatial or scene mesh meta data and game state meta data are used to determine fantasy object position, and clip meta data are used to select a clip or one or more frames that use an appropriate camera position and angle to frame the fantasy object. At block 630, Camera B is selected because the physical camera in the clip or one or more frames is moving in a same direction of travel as the fantasy object. The camera movement meta data is derived from clip meta data (for physical camera movement) and game state date (for fantasy object movement). If the fantasy object were moving in an opposite direction, Camera B would not be selected. At block 640, Camera C is selected because game state meta data show that Camera C is pointing at or showing the game goal. In some embodiments, the rules engine prefers cameras that are spatially aligned with a direction of a game goal. At block 650, Camera F is selected over Camera E because the rules favor close-ups of the fantasy object over a wide angle field of view, although both are available. If the fantasy object were moving, Camera E may be selected since its meta data indicates a wide angle field of view.

The pre-recorded video, playing either from a first decoder or a second decoder, is integrated onto the scene model or mesh. In some embodiments, the presentation technique, shown as a method in FIG. 2, includes creating a scene model based, at least in part, on one or more images (e.g., static images, video frames, LIDAR, laser data, etc.) of a physical environment S210; generating a fantasy object S220; integrating the fantasy object onto the scene mesh S230; and determining a state of the fantasy object S240. The state of the fantasy object may be based on any of the following, non-limiting examples: user input, game state, device data, environmental data, network data (e.g., multiple users playing the game), spatial data, a desired game effect (e.g., drama, outcome, style, tone, etc.), rules engine data, etc.

Figure 2:
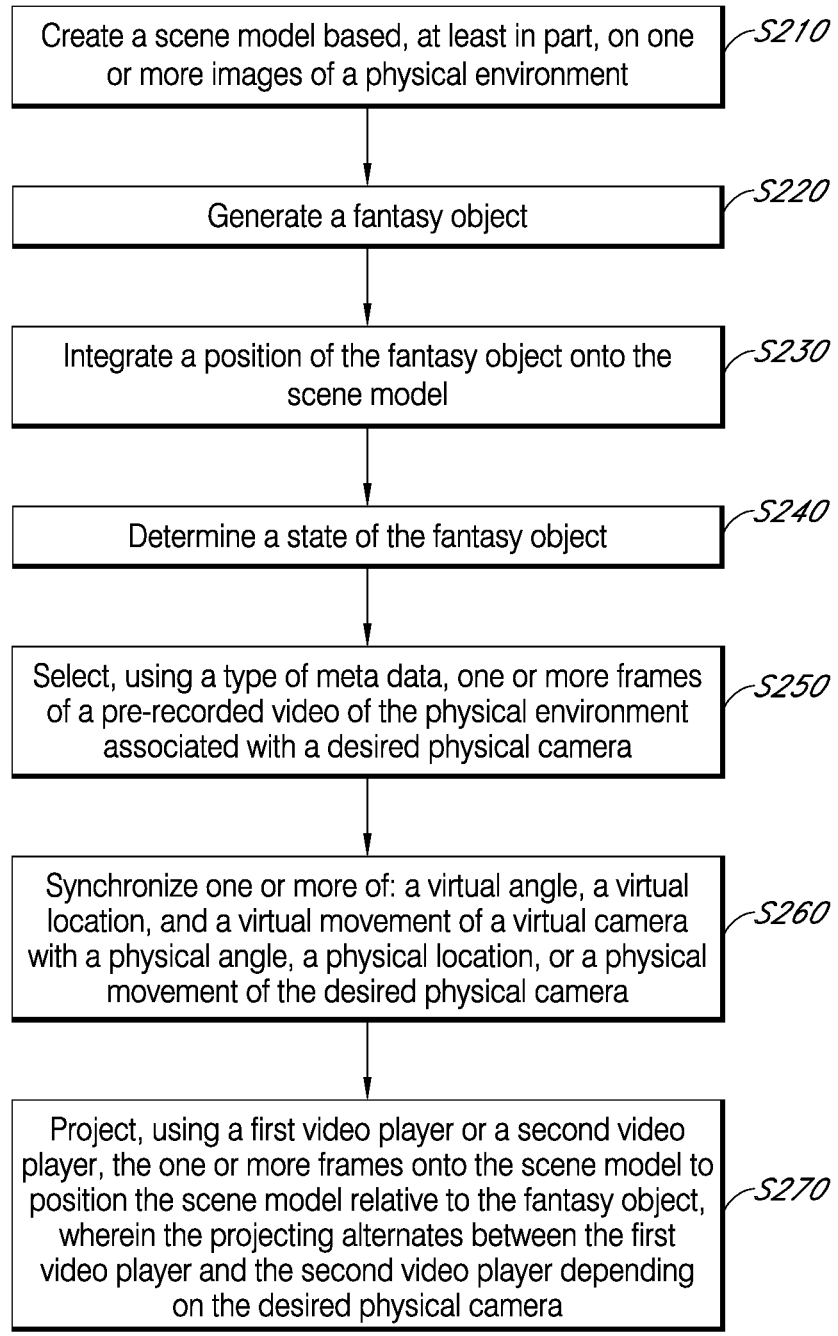
FIG. 2 illustrates a method of generating a frame-based interactive augmented video system.

The method of FIG. 2 further includes selecting one or more frames and/or one or more clips associated with a desired physical camera, wherein selecting is based on a type of meta data. In some embodiments, a virtual camera position in the scene mesh is synchronized to a physical camera position in the pre-recorded video, a desired (or appropriate or best) physical camera having been selected based on meta data described elsewhere herein. Using the temporal synchronization and spatial registration, the virtual camera may be aligned or synchronized with the physical camera at Block S260, whose position and/or movement is known relative to a video frame, such that the virtual camera projects an appropriate frame of video for a current position of the fantasy object. Notably, a generating subsystem (or module) may generate the scene mesh for a particular perspective or context of one or more fantasy objects. For example, based on user input, a measured view direction, a focal point of the fantasy object, and/or various types of meta data, the scene mesh may be created with an appropriate orientation and displayed at an appropriate time, angle, and/or location in the video, based on synchronization of a virtual camera with a physical camera in the pre-recorded video. In addition, the fantasy object may include visual cues, such as shadowing, which may be based at least in part on meta data associated with the pre-recorded video (e.g., meta data indicating one or more light sources and/or their locations and intensities; environmental data; direction of sun; other 360 degree view data; geographic data; compass data; etc.). The generating subsystem may also analyze subsequent clips or frames in the pre-recorded video to track the dynamic evolution in the position and orientation of one or more physical objects and may dynamically update the scene mesh (e.g., using a first and second video decoder), so that the fantasy object is correctly oriented and positioned relative to the one or more physical objects represented in the scene mesh. At Block S270, one or more clips or one or more frames are projected, using a first video player or a second video player (as described elsewhere herein), onto the scene model to position the scene model relative to the fantasy object. The projecting alternates between the first video player and the second video player depending on the desired physical camera, as shown and described at least in connection with FIG. 4.

In some embodiments of method of FIG. 2, there may be additional or fewer operations. Moreover, the order of the operations may be changed, and/or two or more operations may be combined into a single operation or performed at least partially in parallel.

The presentation technique may be used to enhance a variety of content, such as: streamed video, over-the-top content, video games, social media, navigation, tourism and sightseeing, music, retail, translation, broadcast and live events, medical, visual art, e-commerce, education, military, emergency medical services, etc. In this way, the presentation technique may make the content and the associated applications more interactive, thereby providing an improved user experience relative to static content.

Figure 3:
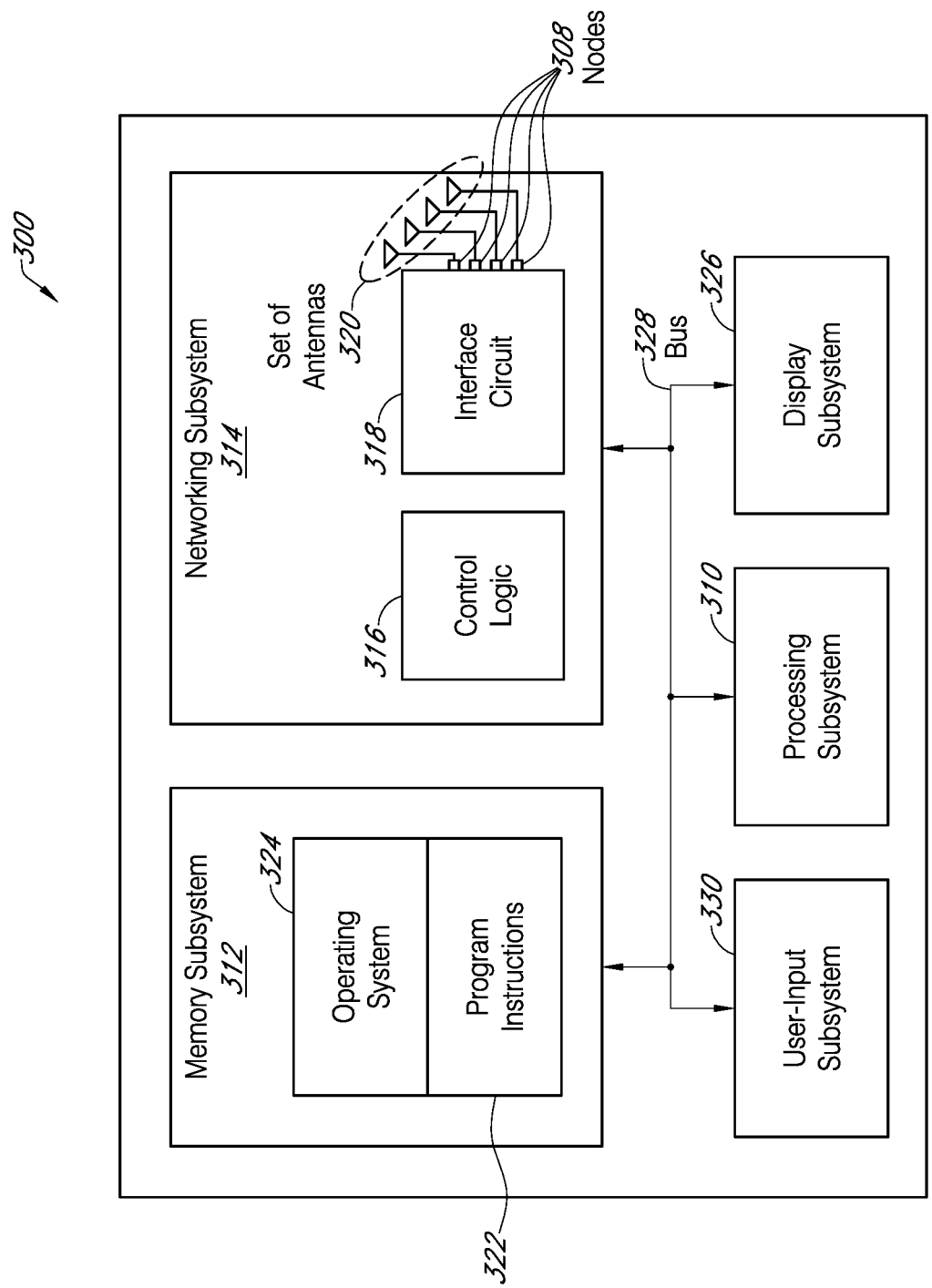
FIG. 3 illustrates a schematic of one embodiment of an electronic device.

We now describe embodiments of an electronic device, which may perform the presentation technique. FIG. 3 presents a block diagram of an electronic device 300 (which may be a cellular telephone or another electronic device, etc.) in accordance with some embodiments. This electronic device includes processing subsystem 310, memory subsystem 312, and networking subsystem 314. Processing subsystem 310 includes one or more devices configured to perform computational operations. For example, processing subsystem 310 can include one or more microprocessors, application-specific integrated circuits (ASICs), microcontrollers, programmable-logic devices, one or more GPUs, and/or one or more digital signal processors (DSPs).

Memory subsystem 312 includes one or more devices for storing data and/or instructions for processing subsystem 310 and networking subsystem 314. For example, memory subsystem 312 can include dynamic random access memory (DRAM), static random access memory (SRAM), a read-only memory (ROM), flash memory, and/or other types of memory. In some embodiments, instructions for processing subsystem 310 in memory subsystem 312 include: one or more program modules or sets of instructions (such as program instructions 322 or operating system 324), which may be executed by processing subsystem 310. For example, a ROM can store programs, utilities or processes to be executed in a non-volatile manner, and DRAM can provide volatile data storage, and may store instructions related to the operation of electronic device 300. Note that the one or more computer programs may constitute a computer-program mechanism, a computer-readable storage medium or software. Moreover, instructions in the various modules in memory subsystem 312 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 310. In some embodiments, the one or more computer programs are distributed over a network-coupled computer system so that the one or more computer programs are stored and executed in a distributed manner.

In addition, memory subsystem 312 can include mechanisms for controlling access to the memory. In some embodiments, memory subsystem 312 includes a memory hierarchy that comprises one or more caches coupled to a memory in electronic device 300. In some of these embodiments, one or more of the caches is located in processing subsystem 310.

In some embodiments, memory subsystem 312 is coupled to one or more high-capacity mass-storage devices (not shown). For example, memory subsystem 312 can be coupled to a magnetic or optical drive, a solid-state drive, or another type of mass-storage device. In these embodiments, memory subsystem 312 can be used by electronic device 300 as fast-access storage for often-used data, while the mass-storage device is used to store less frequently used data.

Networking subsystem 314 includes one or more devices configured to couple to and communicate on a wired and/or wireless network (i.e., to perform network operations), including: control logic 316, an interface circuit 318 and a set of antennas 320 (or antenna elements) in an adaptive array that can be selectively turned on and/or off by control logic 316 to create a variety of optional antenna patterns or 'beam patterns.' (While FIG. 3 includes set of antennas 320, in some embodiments electronic device 300 includes one or more nodes, such as nodes 308, e.g., a pad, which can be coupled to set of antennas 320. Thus, electronic device 300 may or may not include set of antennas 320.) For example, networking subsystem 314 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 314 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments, a 'network' or a 'connection' between the electronic devices does not yet exist. Therefore, electronic device 300 may use the mechanisms in networking subsystem 314 for performing simple wireless communication between the electronic devices, e.g., transmitting advertising or beacon frames and/or scanning for advertising frames transmitted by other electronic devices.

Within electronic device 300, processing subsystem 310, memory subsystem 312, and networking subsystem 314 are coupled together using bus 328 that facilitates data transfer between these components. Bus 328 may include an electrical, optical, and/or electro-optical connection that the subsystems can use to communicate commands and data among one another. Although only one bus 328 is shown for clarity, different embodiments can include a different number or configuration of electrical, optical, and/or electro-optical connections among the subsystems.

In some embodiments, electronic device 300 includes a display subsystem 326 for displaying information on a display, which may include a display driver and the display, such as a liquid-crystal display, a multi-touch touchscreen, etc. Display subsystem 326 may be controlled by processing subsystem 310 to display information to a user (e.g., a fantasy story in an interactive augmented video).

In some embodiments, the system further includes a display subsystem (or module). The display subsystem is configured to project the pre-recorded video onto the scene mesh and display one or more fantasy objects on the scene mesh to provide a fantasy story via interactive augmented video, which may then be presented on a display of or associated with the electronic device. For example, the fantasy object in this fantasy story may be an animated fruit (such as an avocado) that moves through the environment based at least in part on user input. In some embodiments, the presentation technique is used to provide an interactive cooking game or application, in which users choose different ingredients and process them in different ways (mixing, chopping, blending, etc.) to create final fantasy dishes and having the user engage in every cooking operation.

Moreover, display subsystem 326 may include one or more different types of electronic displays and display technologies, including: a heads-up display, eyeglasses, contact lenses, a virtual retinal display, a cathode ray tube (CRT), a plasma display panel (PDP), a liquid crystal display (LCD), an electroluminescent display (EL), an organic light emitting diode (OLED) and active matrix OLED (AMOLED) display, an electrophoretic displays (EP) and various displays that employ electromechanical or electrofluidic light modulation (e.g., a digital micromirror device, an electrowetting display, etc.). In general, the electronic display in display subsystem 326 may be categorized as either an active display (such as a display that emits light) or a passive display (such as a display that modulates light provided by another source). Furthermore, the electronic display in display subsystem 326 may present or display: 2D images, so-called 2.5D images and/or 3D images (such as stereoscopic or holographic images).

Electronic device 300 can also include a user-input subsystem 330 that allows a user of the electronic device 300 to interact with electronic device 300. For example, user-input subsystem 330 can take a variety of forms, such as: a button, keypad, dial, touch screen, audio input interface, visual/image capture input interface, input in the form of sensor data, etc.

Electronic device 300 can be (or can be included in) any electronic device with at least one network interface. For example, electronic device 300 may include: a cellular telephone or a smartphone, a tablet computer, a laptop computer, a notebook computer, a personal or desktop computer, a netbook computer, a media player device, an electronic book device, a smartwatch, a wearable computing device, a portable computing device, a consumer-electronic device, as well as any other type of electronic computing device having wireless communication capability that can include communication via one or more wireless communication protocols.

Although specific components are used to describe electronic device 300, in alternative embodiments, different components and/or subsystems may be present in electronic device 300. For example, electronic device 300 may include one or more additional processing subsystems, memory subsystems, networking subsystems, and/or display subsystems. Additionally, one or more of the subsystems may not be present in electronic device 300. Moreover, in some embodiments, electronic device 300 may include one or more additional subsystems that are not shown in FIG. 3. Also, although separate subsystems are shown in FIG. 3, in some embodiments some or all of a given subsystem or component can be integrated into one or more of the other subsystems or component(s) in electronic device 300. For example, in some embodiments program instructions 322 are included in operating system 324 and/or control logic 316 is included in interface circuit 318.

Moreover, the circuits and components in electronic device 300 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 314. This integrated circuit may include hardware and/or software mechanisms that are used for transmitting wireless signals from electronic device 300 and receiving signals at electronic device 300 from other electronic devices. Aside from the mechanisms herein described, radios are generally known in the art and hence are not described in detail. In general, networking subsystem 314 and/or the integrated circuit can include any number of radios. Note that the radios in multiple-radio embodiments function in a similar way to the described single-radio embodiments.

In some embodiments, networking subsystem 314 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the presentation technique may be implemented using program instructions 322, operating system 324 (such as a driver for interface circuit 318) or in firmware in interface circuit 318. Alternatively or additionally, at least some of the operations in the presentation technique may be implemented in a physical layer, such as hardware in interface circuit 318. In some embodiments, the presentation technique is implemented, at least in part, in a MAC layer and/or in a physical layer in interface circuit 318.

Described herein are various non-limiting embodiments of the invention as shown and/or described.

One aspect of the present disclosure is directed to an electronic device, comprising: a computation device; a first video player; a second video player; a display coupled to the computation device; and memory, coupled to the computation device, configured to store program instructions. When executed by the computation device, the program instructions cause the electronic device to perform operations comprising: creating a scene model based, at least in part, on one or more images of a physical environment; generating a fantasy object; integrating a position of the fantasy object onto the scene model; determining a state of the fantasy object, wherein the state of the fantasy object is based, at least in part, on user input; selecting, using a type of meta data, one or more frames of a pre-recorded video of the physical environment associated with a desired physical camera, wherein each of the one or more frames is associated with a frame number, wherein each of the one or more frames is acquired with a physical camera; synchronizing one or more of: a virtual angle, a virtual location, and a virtual movement of a virtual camera with a physical angle, a physical location, or a physical movement of the desired physical camera; projecting, using the first video player or the second video player, the one or more frames onto the scene model to position the scene model relative to the fantasy object, wherein the projecting alternates between the first video player and the second video player depending on the desired physical camera, and wherein the one or more frames is determined using the frame number instead of a timestamp; and displaying, on the display, the one or more frames and the fantasy object to provide an interactive augmented video that combines the fantasy object in views of the physical environment.

In any of the preceding embodiments, there is a time delay between projecting with the first video player and the second video player.

In any of the preceding embodiments, the operations performed by the computation device further comprise adjusting for the time delay by looping a subset of the one or more frames projected by the first video player until the second video player begins projecting a second subset of the one or more frames.

In any of the preceding embodiments, the time delay between the first video player projecting and the second video player projecting is between 0.2 seconds and 0.7 seconds.

In any of the preceding embodiments, the physical location of the desired physical camera is an x, y, z coordinate or an x, y, z, w coordinate.

In any of the preceding embodiments, the physical movement of the desired physical camera includes zooming, panning, remaining fixed, movement, rotation, motion, and any combination thereof.

In any of the preceding embodiments, the type of meta data includes one or more of: clip meta data, spatial meta data, device meta data, game state meta data, network meta data, and rules meta data In any of the preceding embodiments, the clip meta data comprise one or more of: a field of view of the physical camera in the prerecorded clip, a depth of field of the physical camera in the prerecorded clip, a movement of the physical camera in the prerecorded clip, a direction of movement or field of view of the physical camera in the prerecorded clip, an inclusion of an actor in the prerecorded clip, and frame level meta data.

In any of the preceding embodiments, the spatial meta data comprise one or more of: a tracked object in the scene mesh and an environment in the scene mesh.

In any of the preceding embodiments, the device meta data comprise one or more of: user input, a volume of the electronic device, a time of day sensed by the electronic device, a location of the electronic device sensed by the electronic device, and an acceleration of the electronic device sensed by an accelerometer in the electronic device.

In any of the preceding embodiments, the network meta data comprise one or more of: a presence of additional users and a presence of a synchronized event.

In any of the preceding embodiments, the game state meta data comprise one or more of: a position of the fantasy object, a speed of the fantasy object, a score of the fantasy object, a time remaining in a game, and a current game goal.

In any of the preceding embodiments, the operations performed by the electronic device further comprise receiving a user input comprising a drawn path to indicate a movement path for the fantasy object. Further, the operations performed by the electronic device further comprise identifying one or more increments along the drawn path; and selecting, using the type of meta data or a second type of meta data, the one or more frames associated with the desired physical camera for each increment.

In any of the preceding embodiments, the operations performed by the electronic device further comprise receiving a user input comprising one or more of: a selection of the fantasy object, a movement of the fantasy object, or an interaction with the fantasy object.

In any of the preceding embodiments, the operations performed by the electronic device further comprise selecting, using the type of meta data or a second type of meta data, the one or more frames associated with the desired physical camera for the selection of the fantasy object, the movement of the fantasy object, or the interaction with the fantasy object.

In any of the preceding embodiments, the one or more frames comprise one or more clips of the pre-recorded video.

In any of the preceding embodiments, during runtime, the steps of determining, selecting, synchronizing, projecting, and displaying are performed repetitively by the electronic device Another aspect of the present disclosure is directed to a method for providing an interactive augmented experience using prerecorded video, comprising: creating, using a computation device, a scene model based, at least in part, on one or more images of a physical environment; generating, using a computation device, a fantasy object; integrating, using a computation device, a position of the fantasy object onto the scene model; determining, using a computation device, a state of the fantasy object, wherein the state of the fantasy object is based, at least in part, on user input; selecting, using a computation device and a type of meta data, one or more frames of a pre-recorded video of the physical environment associated with a desired physical camera, wherein each of the one or more frames is associated with a frame number, wherein each of the one or more frames is acquired with a physical camera; synchronizing, using a computation device, one or more of: a virtual angle, a virtual location, and a virtual movement of a virtual camera with a physical angle, a physical location, or a physical movement of the desired physical camera; projecting, using the first video player or the second video player, the one or more frames onto the scene model to position the scene model relative to the fantasy object, wherein the projecting alternates between the first video player and the second video player depending on the desired physical camera, and wherein the one or more frames is determined using the frame number instead of a timestamp; and displaying, on the display coupled to the computation device, the one or more frames and the fantasy object to provide an interactive augmented video that combines the fantasy object in views of the physical environment.

In any of the preceding embodiments, the method further comprises adjusting for a time delay between projecting with the first video player and the second video player.

In any of the preceding embodiments, adjusting comprises looping a subset of the one or more frames projected by the first video player until the second video player begins projecting a second subset of the one or more frames.

In any of the preceding embodiments, the time delay is between projecting with the first video player and the second video player is 0.2 seconds and 0.7 seconds.

In any of the preceding embodiments, the method further comprises further comprising determining the physical location of the desired physical camera, wherein the physical location is an x, y, z coordinate or an x, y, z, w coordinate.

In any of the preceding embodiments, the physical movement of the desired physical camera includes zooming, panning, remaining fixed, movement, rotation, motion, and any combination thereof.

In any of the preceding embodiments, the type of meta data includes one or more of: clip meta data, spatial meta data, device meta data, game state meta data, network meta data, and rules meta data In any of the preceding embodiments, the clip meta data comprise one or more of: a field of view of the physical camera in the prerecorded clip, a depth of field of the physical camera in the prerecorded clip, a movement of the physical camera in the prerecorded clip, a direction of movement or field of view of the physical camera in the prerecorded clip, an inclusion of an actor in the prerecorded clip, and frame level meta data.

In any of the preceding embodiments, the spatial meta data comprise one or more of: a tracked object in the scene mesh and an environment in the scene mesh.

In any of the preceding embodiments, the device meta data comprise one or more of: user input, a volume of the electronic device, a time of day sensed by the electronic device, a location of the electronic device sensed by the electronic device, and an acceleration of the electronic device sensed by an accelerometer in the electronic device.

In any of the preceding embodiments, the network meta data comprise one or more of: a presence of additional users and a presence of a synchronized event.

In any of the preceding embodiments, the game state meta data comprise one or more of: a position of the fantasy object, a speed of the fantasy object, a score of the fantasy object, a time remaining in a game, and a current game goal.

In any of the preceding embodiments, the method further comprises receiving a user input comprising a drawn path to indicate a movement path for the fantasy object; and identifying one or more increments along the drawn path; and selecting, using the type of meta data or a second type of meta data, the one or more frames associated with the desired physical camera for each increment.

In any of the preceding embodiments, the plurality of pre-recorded clips comprises a pre-recorded video.

In any of the preceding embodiments, the method further comprises repeating the steps of determining, selecting, synchronizing, projecting, and displaying.

In any of the preceding embodiments, the method further comprises receiving a user input comprising one or more of: a selection of the fantasy object, a movement of the fantasy object, or an interaction with the fantasy object.

In any of the preceding embodiments, the method further comprises selecting, using the type of meta data or a second type of meta data, the one or more frames associated with the desired physical camera for the selection of the fantasy object, the movement of the fantasy object, or the interaction with the fantasy object.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

As used in the description and claims, the singular form "a", "an" and "the" include both singular and plural references unless the context clearly dictates otherwise. For example, the term "frame" may include, and is contemplated to include, a plurality of frames. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a length or pressure), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. "Consisting of" shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
a computation device;
a first video player;
a second video player;
a display coupled to the computation device; and
memory, coupled to the computation device, configured to store program instructions, wherein, when executed by the computation device, the program instructions cause the electronic device to perform operations comprising:
creating a scene model based, at least in part, on one or more images of a physical environment;
generating a fantasy object;
integrating a position of the fantasy object onto the scene model;
determining a state of the fantasy object, wherein the state of the fantasy object is based, at least in part, on user input;
selecting, using a type of meta data, one or more frames of a pre-recorded video of the physical environment associated with a desired physical camera, wherein each of the one or more frames is associated with a frame number, wherein each of the one or more frames is acquired with a physical camera;
synchronizing one or more of: a virtual angle, a virtual location, and a virtual movement of a virtual camera with a physical angle, a physical location, or a physical movement of the desired physical camera;
projecting, using the first video player or the second video player, the one or more frames onto the scene model to position the scene model relative to the fantasy object, wherein the projecting alternates between the first video player and the second video player depending on the desired physical camera, and wherein the one or more frames is determined using the frame number instead of a timestamp; and displaying, on the display, the one or more frames and the fantasy object to provide an interactive augmented video that combines the fantasy object in views of the physical environment.

2. The electronic device of claim 1, wherein there is a time delay between projecting with the first video player and the second video player.

3. The electronic device of claim 2, wherein the operations performed by the computation device further comprise adjusting for the time delay by looping a subset of the one or more frames projected by the first video player until the second video player begins projecting a second subset of the one or more frames.

4. The electronic device of claim 2, wherein the time delay is between 0.2 seconds and 0.7 seconds.

5. The electronic device of claim 1, wherein the physical location of the desired physical camera is an x, y, z coordinate or an x, y, z, w coordinate.

6. The electronic device of claim 1, wherein the physical movement of the desired physical camera includes zooming, panning, remaining fixed, movement, rotation, motion, and any combination thereof.

7. The electronic device of claim 1, wherein the type of meta data includes one or more of: clip meta data, spatial meta data, device meta data, game state meta data, network meta data, and rules meta data.

8. The electronic device of claim 7, wherein the clip meta data comprise one or more of: a field of view of the physical camera in the prerecorded clip, a depth of field of the physical camera in the prerecorded clip, a movement of the physical camera in the prerecorded clip, a direction of movement or field of view of the physical camera in the prerecorded clip, an inclusion of an actor in the prerecorded clip, and frame level meta data.

9. The electronic device of claim 7, wherein the spatial meta data comprise one or more of: a tracked object in the scene model and an environment in the scene model.

10. The electronic device of claim 7, wherein the device meta data comprise one or more of: user input, a volume of the electronic device, a time of day sensed by the electronic device, a location of the electronic device sensed by the electronic device, and an acceleration of the electronic device sensed by an accelerometer in the electronic device.

11. The electronic device of claim 7, wherein the network meta data comprise one or more of: a presence of additional users and a presence of a synchronized event.

12. The electronic device of claim 7, wherein the game state meta data comprise one or more of: a position of the fantasy object, a speed of the fantasy object, a score of the fantasy object, a time remaining in a game, and a current game goal.

13. The electronic device of claim 1, wherein the operations performed by the electronic device further comprise receiving a user input comprising a drawn path to indicate a movement path for the fantasy object.

14. The electronic device of claim 13, wherein the operations performed by the electronic device further comprise identifying one or more increments along the drawn path; and selecting, using the type of meta data or a second type of meta data, the one or more frames associated with the desired physical camera for each increment.

15. The electronic device of claim 1, wherein the operations performed by the electronic device further comprise receiving a user input comprising one or more of: a selection of the fantasy object, a movement of the fantasy object, or an interaction with the fantasy object.

16. The electronic device of claim 15, wherein the operations performed by the electronic device further comprise selecting, using the type of meta data or a second type of meta data, the one or more frames associated with the desired physical camera for the selection of the fantasy object, the movement of the fantasy object, or the interaction with the fantasy object.

17. The electronic device of claim 1, wherein the one or more frames comprise one or more clips of the pre-recorded video.

18. The electronic device of claim 1, wherein, during runtime, the steps of determining, selecting, synchronizing, projecting, and displaying are performed repetitively by the electronic device.

19. A method for providing an interactive augmented experience using prerecorded video, comprising:

creating, using one or more computation devices, a scene model based, at least in part, on one or more images of a physical environment;

generating, using the one or more computation devices, a fantasy object;

integrating, using the one or more computation devices, a position of the fantasy object onto the scene model;

determining, using the one or more computation devices, a state of the fantasy object, wherein the state of the fantasy object is based, at least in part, on user input;

selecting, using the one or more computation devices and a type of meta data, one or more frames of a pre-recorded video of the physical environment associated with a desired physical camera, wherein each of the one or more frames is associated with a frame number, wherein each of the one or more frames is acquired with a physical camera;

synchronizing, using the one or more computation devices, one or more of: a virtual angle, a virtual location, and a virtual movement of a virtual camera with a physical angle, a physical location, or a physical movement of the desired physical camera;

projecting, using a first video player or a second video player, the one or more frames onto the scene model to position the scene model relative to the fantasy object, wherein the projecting alternates between the first video player and the second video player depending on the desired physical camera, and wherein the one or more frames is determined using the frame number instead of a timestamp; and displaying, on a display coupled to the one or more computation devices, the one or more frames and the fantasy object to provide an interactive augmented video that combines the fantasy object in views of the physical environment.

20. The method of claim 19, further comprising adjusting for a time delay between projecting with the first video player and the second video player by looping a subset of the one or more frames projected by the first video player until the second video player begins projecting a second subset of the one or more frames.

* * * * *